June 13, 1961 E. GROSZ 2,988,197
SORTING APPARATUS
Filed Dec. 17, 1958 4 Sheets-Sheet 2

June 13, 1961 E. GROSZ 2,988,197
SORTING APPARATUS
Filed Dec. 17, 1958 4 Sheets-Sheet 3
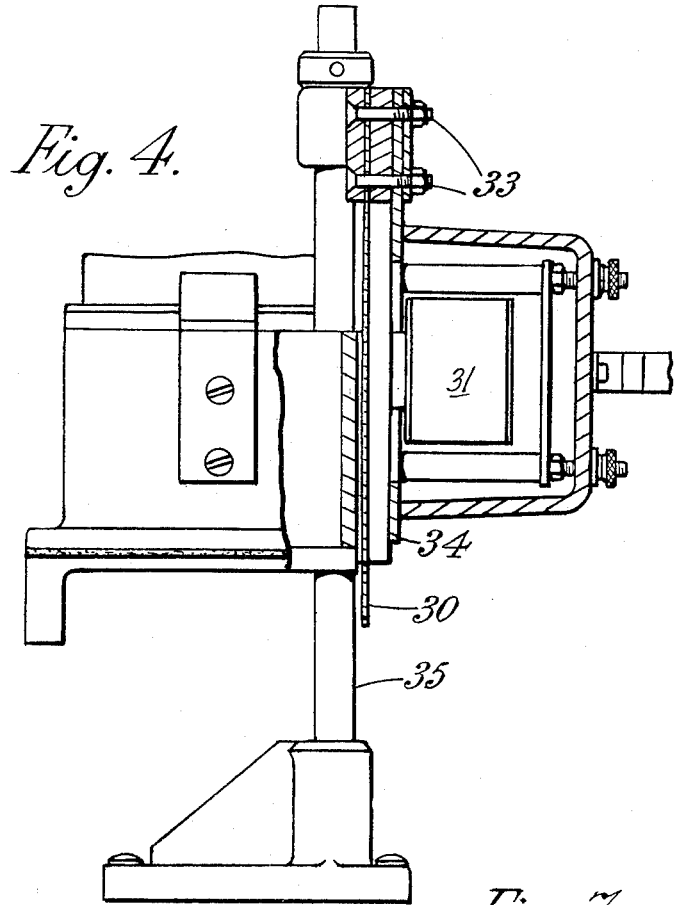
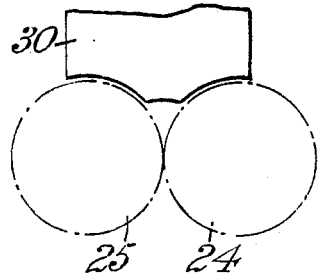
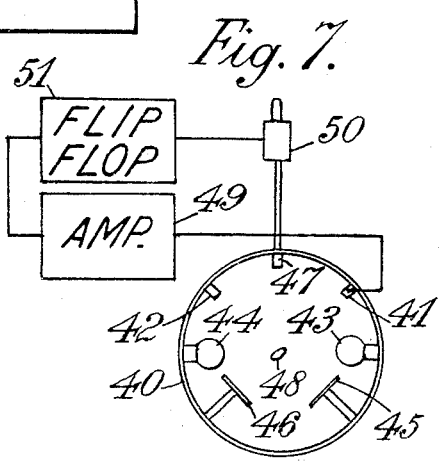

June 13, 1961  E. GROSZ  2,988,197
SORTING APPARATUS
Filed Dec. 17, 1958  4 Sheets-Sheet 4

United States Patent Office 2,988,197
Patented June 13, 1961

2,988,197
SORTING APPARATUS
Emil Grosz, London, England, assignor to Gromax, Inc., New York, N.Y., a corporation of New York
Filed Dec. 17, 1958, Ser. No. 780,994
Claims priority, application Great Britain June 19, 1958
4 Claims. (Cl. 198—30)

This invention relates to photo-electric sorting apparatus and has for its principal object to provide improved means for feeding articles singly from a bulk supply to a photo-electric sorting system for selecting or rejecting articles giving a particular response to a photo-electric detector system.

The invention makes use of apparatus of the kind having two rollers arranged side by side with parallel axes sloping downwardly and means for rotating the rollers in opposite directions so that articles having dimensions small compared with the diameter of the rollers fed onto the rollers are caused to travel down in a single line along the length of the rollers. Such apparatus employing rollers for feeding articles in a single line is well known and is used, for example, for sorting beans, almonds, nuts and like articles where unwanted specimens are normally discoloured. The rollers have a slope such that, if they were not rotating, the articles would not slide down the groove formed by the two rollers. The rollers are rotated in such directions as to move their top surfaces outwardly so lifting the articles slightly and thus causing them to travel down the rollers as they slip back into the groove. Heretofore it has been the practice to feed the articles onto the rollers from a simple hopper and it has been necessary to restrict the outlet flow from the hopper very considerably in order to prevent a bunch of articles forming on the rollers and clogging the system. This limitation of the flow of the articles down the rollers when the articles are fed from a simple hopper has to be such that the articles are not in a continuous stream. There have to be gaps between the successive articles and this results in a non-uniform rate of flow. Such a non-uniform flow with gaps between the articles not only limits the capacity of the apparatus but also puts much more severe demands on the sensitivity and selectivity of the detecting and rejecting mechanism than would be the case if the articles could be fed to the detective system at a uniform rate with substantially no gaps between successive articles.

It is one of the principal objects of the present invention to provide improved means for feeding articles onto the rollers in apparatus of the kind described above.

It is another object of the invention to improve the capacity of sorting apparatus of the kind employing rollers for feeding articles singly to a detector.

It is yet another object of the present invention to provide improved means for preventing the clogging of the feed system when articles are fed at a high rate onto the rollers.

According to one feature of the invention, apparatus for feeding articles singly from a bulk supply comprises two rollers arranged side by side with parallel axes sloping downwardly, means for rotating the rollers in opposite directions with their upper surfaces moving outwardly, means for feeding articles having dimensions small compared with the diameter of the rollers onto the rollers at the upper end thereof whereby the articles are caused to travel down in a single line along the length of the rollers, a vibratable member mounted above the rollers and shaped at one end to lie adjacent the surfaces of the rollers with clearance in the center of the groove formed by the rollers, said member being arranged above the rollers at a point near but below the point of feed of the articles onto the rollers and means for vibrating at least the lower end of such member with a vibratory movement having a component in the direction of the roller axes. Such a vibratable member serves to break up any tendency for the articles to clog where they are fed onto the rollers. The member is shaped so that the articles can pass singly underneath its lower end at the center of the groove formed by the rollers.

According to another aspect of the invention apparatus for feeding articles singly from the bulk supply comprises a hopper having a vertical outlet opening at the bottom of the hopper, a chute adjacent said outlet opening to receive articles leaving the hopper, a vibrator arranged to vibrate said chute to traverse articles along the chute, an open ended upright feed tube arranged to receive articles leaving the chute, which feed tube has a number of baffle plates one below the other sloping downwardly alternately in opposite directions, two rollers rotatably mounted side by side with parallel axes sloping downwardly and with the upper end of the groove formed by the two rollers underneath the lower end of said feed tube, and means for rotating the rollers in opposite directions with their upper surfaces moving outwardly.

In the following description of one embodiment of the invention, reference will be made to the accompanying drawings in which:

FIGURE 1 is a side elevation view of apparatus for photo-electric sorting or articles such as almonds, beans or the like;

FIGURE 4 is a side elevation partly in section showing, to a larger scale, a detail of the apparatus of FIGURE 1;

FIGURE 6 is a front elevation of a vibratable plate; and

FIGURE 7 is a diagrammatic representation of a photo-electric detector system.

Figure 1:
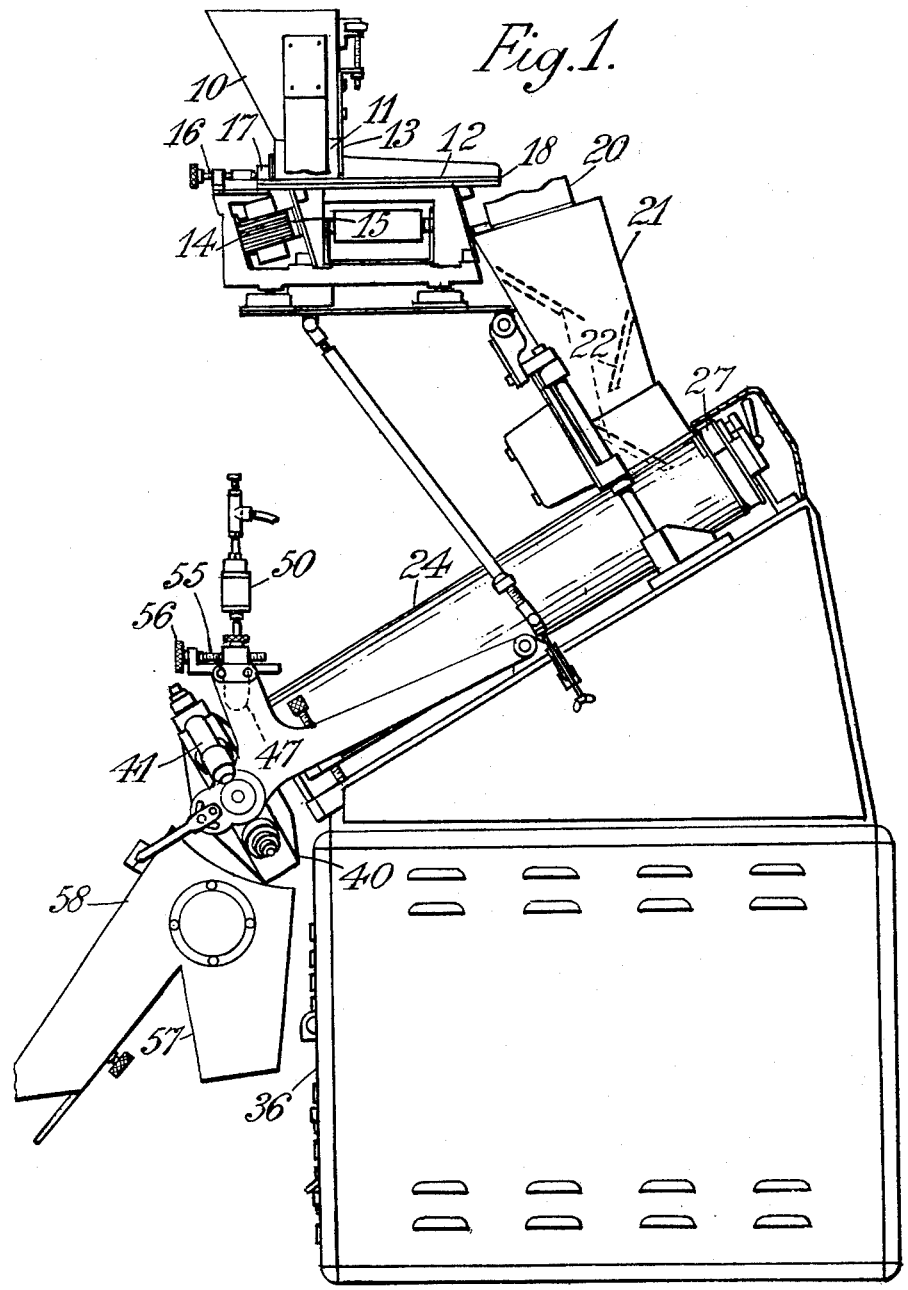
Figure 2:
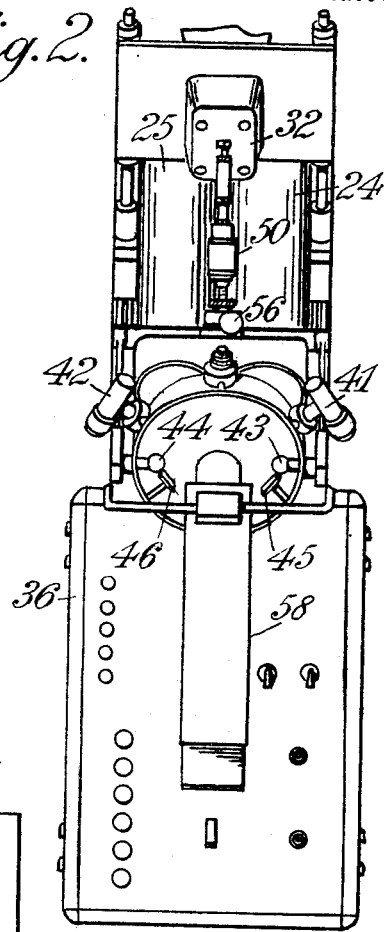
FIGURE 2 is a front elevation of the lower part of the apparatus of FIGURE 1.
Figure 3:
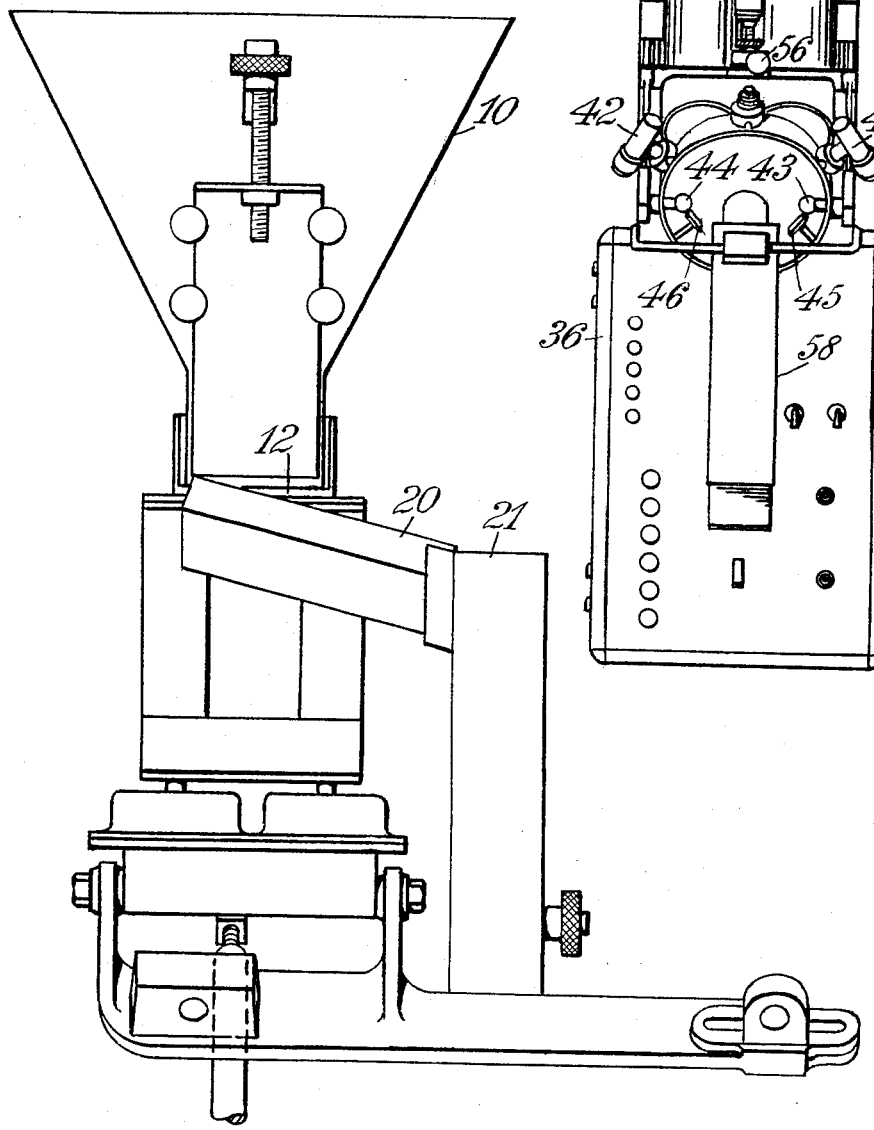
FIGURE 3 is an end elevation of a hopper and primary feed system in the apparatus of FIGURE 1.
Figure 5:
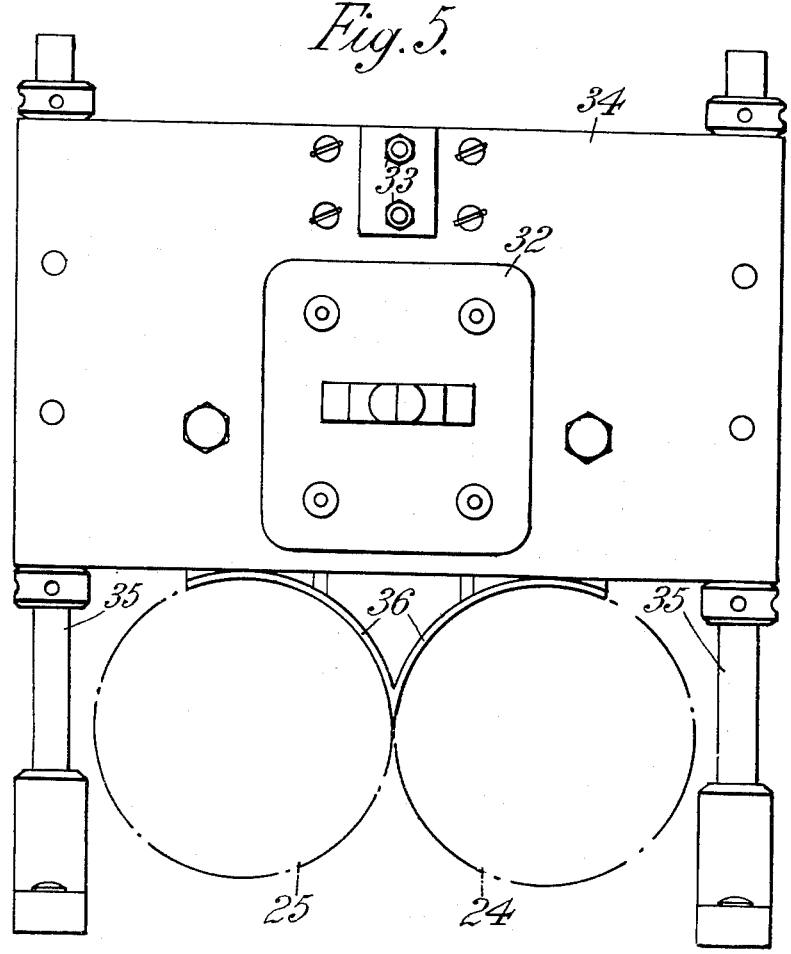
FIGURE 5 is a front elevation of the part shown in FIGURE 4 with the magnetic vibrator removed.

The drawings illustrate an apparatus for the photo-electric sorting of almonds, beans, peanuts or like articles in which it is required to reject discoloured articles. The machine may, for example, be utilised to segregate all articles which are black or very dark in colour, or it may be used to segregate articles which are white or light in colour. The articles to be sorted are placed in a primary feed hopper 10 which at its lower end has an upright rectangular outlet portion 11 situated above a substantially horizontal chute 12, the surface of which is covered with polytetrafluorethylene to minimise friction. One wall 13 of the rectangular outlet portion 11 of the hopper is terminated at its lower end above the floor of the chute 12 at such a distance as to permit the passage of the articles to be sorted one at a time from the hopper into the open part of the chute. The chute 12 is magnetically vibrated by means of an electromagnetic vibrator comprising a winding 14 which is energised from a low frequency alternating supply mains, which winding vibrates an armature 15 connected to the base of the chute 12 so that the latter is vibrated horizontally with to and fro motion along the line of the chute. An adjustable screw 16 forms an adjustable stop which can be positioned with respect to a rubber block 17 mounted on the chute 12 to limit the amplitude or vibration of the chute. The articles from the hopper 10 pass under the lower edge of the wall 13 and due to the vibration of the chute 12 gradually move along that chute in a single layer. The end 18 of the chute remote from the hopper 10 lies above the upper end of a sloping chute 20 into which the articles fall. This sloping chute guides the articles into a feed tube 21 of rectangular section having a number of baffle plates 22 arranged alternately on opposite walls of the feed tube 21 and sloping downwardly and inwardly so that the articles fall from one plate onto the other in a zig-zag path. The directions of slope of the baffle plates are at right angles in plan to the direction of the chute 20. The articles will leave the chute 12 substantially in a line along the straight edge of the open end 18 and hence will tend to pass down the chute 20 in a single file. The baffle plates 22 in the feed tube 21 further assist in keeping the articles in a single stream since, by the arrangement of the baffle plates extending from the walls substantially parallel to the direction of the chute 20, if the articles for any reason are displaced transversely across the chute 20 they will fall onto the topmost baffle plate 22 at different heights in the feed tube 21 and will thus tend to be aligned into a single stream.

The lower end of the feed tube 21 is in the form of a rectangular tube situated immediately above the upper end of a pair of rollers 24, 25, which rollers have their axes sloping downwardly and are arranged parallel to one another and closely adjacent. These two rollers are driven in opposite directions by belt drives 27 from an electric motor so that their upper surfaces tend to move away from one another.

Immediately adjacent the point at which the articles are fed onto the rollers but below this point is arranged a steel plate 30 the lower end of which is shaped as shown in FIGURE 6 so as to leave a gap between the lower end of the plate and the groove formed by the two rollers while being close to the surface of the rollers on either side of this gap. This gap is made of just sufficient size to pass one article at a time; interchangeable plates giving different gaps may be provided for sorting different articles. The plate is magnetically vibrated by means of an electro-magnet 31 in a housing 32 which is secured by bolts 33 on a support plate 34 carried by supporting arms 35 extending upwardly from a base structure 36 and which support the feed tube 21 and the primary feed with its associated vibrator assembly. The electro-magnet 31 is energised from a low frequency alternating supply mains to vibrate the plate 30 in such a direction that the lower end of the plate moves to and fro substantially parallel to the axes of the rollers 24, 25. As stated above, the clearance between the plate and the groove formed by the two rollers is such that only one article at a time can pass between the plate 30 and the rollers. If for any reason a number of articles should be fed together through over-feeding onto the rollers, they will tend to bunch together and clog the system. The vibratable plate 30 will break up any such bunch, so permitting the articles to pass under the plate 30 singly.

A felt pad 36 is provided between the feed assembly and the rollers 24, 25.

The rollers have a slope such that the articles to be sorted will not slide down the groove between the rollers unless the latter are rotating. These rollers, in the known way, give a flow of articles in a single file. The rate of flow of the articles, however, with such rollers is necessarily limited and to obtain the maximum rate of flow, the articles should pass along the rollers in a substantially continuous stream. This cannot be achieved by the use of a simple hopper feed in which articles are allowed to fall freely onto the rollers since there will be a tendency for articles to bunch together and the rate of flow has to be restricted very considerably to prevent any such bunching. In the apparatus thus far described there is provided a primary feed including a hopper 10 and a chute 12 which initially sorts the articles and feeds them in a substantially continuous stream into the top end of the feed guide 21. This feed guide serves to align the articles further so that they fall onto the rollers exactly above the center of the groove in a substantially continuous stream and they are then fed along the rollers passing under the plate 30 which prevents any possibility of bunching where the articles are fed onto the rollers. It has been found that the maximum possible rate of feeding articles using this combination of a primary feed system, feed guide and vibrator plate, is typically double the possible rate of feed using a simple hopper feeding onto the pair of rollers and it is possible to produce a stream of articles with substantially no gap between successive articles.

At the lower end of the rollers 24, 25, the articles leave the rollers in a steady stream and, following a parabolic trajectory, pass through an annular housing 40 which contains two photo-cells 41, 42, two lamps 43, 44, two background plates 45, 46 and an air injection nozzle 47. As is most clearly seen in FIGURE 7, which is a diagrammatic view of the housing 40 and the components mounted thereon, an article 48 passing through the center of the housing 40 is illuminated by the lamps 43, 44 and is viewed by the photo-cells 41, 42 against the background plates 46, 45 respectively. These background plates, which may be made interchangeable if required, are plates having a surface of the same color as the articles which are to be passed. Thus, for example, if it is required to pass white articles and reject discolored articles, the background plates 45, 46 would be made white so that a signal is developed at the photocells 41, 42 if any non-white article passes through the illuminated region in the housing 40. Similarly if it were required to reject white articles and pass black articles, the background plates 45, 46 would be made black so that a signal would only be developed in the photo-cells when a non-black article passes through the housing 40. Two photo-cells are employed so that articles discolored on one side only are rejected. The signals from the photo-cells 41, 42 are combined and are amplified by an amplifier 49 the output of which is employed to operate a solenoid-controlled valve 50 to admit compressed air to the nozzle 47. The nozzle 47 directs the airstream exactly to the point in the center of the housing 40 at which the color of the article passing therethrough is sensed by the photo-cells 41, 42. As shown in FIGURE 1 a lead screw 55 with a knurled operating knob 56 is provided for effecting adjustment of the position of the nozzle 47 in the horizontal direction along the line of the trajectory of the falling articles. Each article as it passes the photo-cells will produce a short duration pulse in the output of the amplifier 49. The duration of the operating pulse for the solenoid is normalised by means of a self-timing flip-flop circuit 51 which produces a pulse of predetermined duration. This duration is chosen in accordance with the speed and minimum size of the articles so that the nozzle 47 gives a short duration blast of air the duration of which is timed to be such that only one article is ejected by each blast. The ejected articles are forced downwardly by the blast of air from the nozzle 47 and pass into an outlet guide 57. If there is no such blast of air, the articles continue on their normal parabolic trajectory and pass into an outlet guide 58. These two guides 57, 58 may lead to bins or other storage means for collecting the sorted articles.

With the photo-electric detecting and ejecting system described above it is particularly desirable that the articles should be fed in a steady stream at a uniform rate. If the stream is not uniform, there is a possibility of articles touching one another and thus the trajectory they take when leaving the rollers 24, 25 may not be uniform. Moreover, the photo-electric system, if the articles are passing through in a steady stream with substantially no gap between successive articles, becomes much less dependent on the relationship between the color of the wanted articles and the background since the steady signal is provided substantially by the continuous stream of articles passing. The sensitivity level thus does not change and the selectivity of the rejecting system as a whole is thus improved.

I claim:

1. Apparatus for feeding articles singly from a bulk supply comprising two rollers arranged side by side with parallel axes sloping downwardly, means for rotating the rollers in opposite directions with their upper surfaces moving outwardly, means for feeding articles having dimensions small compared with the diameter of the rollers onto the rollers at the upper ends thereof whereby the articles are caused to travel down in a single line along the length of the rollers, said feeding means comprising a vibratable member mounted above the rollers and shaped at one end to lie adjacent the surfaces of said rollers with clearance in the center of the groove formed by the two rollers, said member being arranged above said rollers at a point near the point of feed of the articles onto said rollers, and means for vibrating at least the lower end of said member with a vibratory movement having a component in the direction of the roller axes.

2. Apparatus for feeding articles singly from a bulk supply comprising two rollers arranged side by side with parallel axes sloping downwardly, means for rotating the rollers in opposite directions with their upper surfaces moving outwardly, means for feeding articles having dimensions small compared with the diameter of the rollers onto the rollers at the upper ends thereof whereby the articles are caused to travel down in a single line along the length of the rollers, a vibratable plate mounted above the rollers in an upright plane extending transversely to the roller axes, said plate being shaped at its lower end to lie adjacent the surfaces of said rollers with clearance in the center of the groove formed by the two rollers, said plate being arranged adjacent the top surfaces of said rollers near but below the point of feed of the articles onto said rollers, and an electromagnetic vibrator arranged to vibrate at least the lower end of said member with a vibratory movement having a component in the direction of the roller axes.

3. Apparatus for feeding articles singly from a bulk supply comprising two rollers arranged side by side with parallel axes sloping downwardly, means for rotating the rollers in opposite directions with their upper surfaces moving outwardly, means for feeding articles having dimensions small compared with the diameter of the rollers onto the rollers at the upper ends thereof whereby the articles are caused to travel down in a single line along the length of the rollers, a vibratable plate mounted above the rollers in an upright plane extending transversely to the roller axes, said plate having a lower end shaped to have three concave arcs adjacent one another, the outer two of said arcs being circular arcs of the same radius as said rollers, said plate being positioned with the outer two arcs adjacent the top surfaces of the rollers near but below the point of feed of the articles onto the rollers, and an electro-magnetic vibrator arranged to vibrate said vibratable plate with a vibratory movement having a component in the direction of the roller axes.

4. Apparatus for feeding articles singly from a bulk supply comprising a hopper having a vertical outlet opening, a first chute having an inlet end adjacent said outlet opening to receive articles leaving the hopper and having an outlet end, a vibrator arranged to vibrate said first chute to traverse articles along the chute to said outlet end, a second chute sloping downwardly from the outlet end of said first chute and positioned to receive articles leaving the outlet end of said first chute, an open-ended upright feed tube of rectangular section arranged to receive articles leaving said second chute, said feed tube having a number of baffle plates one below the other sloping downwardly in opposite directions which are transverse to the direction of said second chute, two rollers rotatably mounted side by side with parallel axes sloping downwardly, the rollers being positioned with the upper end of the groove formed by the two rollers underneath the lower end of said feed tube, means for rotating said rollers in opposite directions such that the upper surfaces of said rollers move away from one another, a vibratable plate mounted above said rollers and shaped at one end to lie adjacent the surfaces of said rollers with clearance in the center of the groove formed by the two rollers, said plate being arranged above said rollers near but below the point of feed of the articles onto said rollers, and a vibrator arranged to vibrate said plate so that the lower end of the plate has a vibratory movement with a component in the direction of the roller axes.

References Cited in the file of this patent

UNITED STATES PATENTS

| 672,331 | Peck | Apr. 16, 1901 |
| 1,883,078 | Stretch | Oct. 18, 1932 |
| 2,366,256 | Harris | Jan. 2, 1945 |
| 2,690,258 | Cox | Sept. 28, 1954 |
| 2,726,762 | Aubry | Dec. 13, 1955 |

FOREIGN PATENTS

| 580,260 | France | Nov. 4, 1924 |
| 704,599 | Great Britain | Feb. 24, 1954 |